United States Patent [19]
Yamauchi et al.

[11] Patent Number: 4,997,355
[45] Date of Patent: Mar. 5, 1991

[54] APPARATUS FOR PRODUCING SEMICONDUCTOR DEVICES

[75] Inventors: Shunji Yamauchi; Hiroki Mieda, both of Fukuoka, Japan

[73] Assignee: Mitsubishi Denki Kabushiki Kaisha, Japan

[21] Appl. No.: 532,115

[22] Filed: Jun. 1, 1990

Related U.S. Application Data

[63] Continuation of Ser. No. 261,881, Oct. 25, 1988, abandoned.

[30] Foreign Application Priority Data

Nov. 17, 1987 [JP] Japan ................... 62-291326

[51] Int. Cl.⁵ ................. B29C 45/02; H01L 21/56
[52] U.S. Cl. ................. 425/116; 264/272.17; 425/121; 425/126.1; 425/543
[58] Field of Search ........... 264/272.11, 272.17; 425/110, 116, 117, 121, 225, 126.1, 543, 544; 437/209, 210, 211, 214

[56] References Cited

U.S. PATENT DOCUMENTS 3,793,714 2/1974 Bylander ................. 437/211
4,173,821 11/1979 Yamamoto et al. ............ 264/272.17
4,323,415 4/1982 Meyer ................... 425/116
4,534,921 8/1985 Fierkens et al. ............ 264/272.17
4,748,050 5/1988 Takahashi et al. ........... 427/209
4,812,114 3/1989 Kennon et al. ............. 425/116

FOREIGN PATENT DOCUMENTS 55-96642 7/1980 Japan .
60-132716 7/1985 Japan .

Primary Examiner—Jay H. Woo
Assistant Examiner—Khanh P. Nguyen
Attorney, Agent, or Firm—Leydig, Voit & Mayer

[57] ABSTRACT

An apparatus for producing semiconductor devices includes a resin molding section for resin-molding semiconductor chips, a loading section for supplying a lead frame, to which the semiconductor chips are bonded, to the resin molding section, a tablet supplying device which supplies a resin tablet to the resin molding section, an unloading section which takes out the resin-molded semiconductor chips with the lead frame from the resin molding section, and a dust cover which covers the resin molding section, the tablet supplying device and the unloading section.

10 Claims, 2 Drawing Sheets

APPARATUS FOR PRODUCING SEMICONDUCTOR DEVICES

This application is a continuation of application Ser. No. 07/261,881, filed Oct. 25, 1988 now abandoned.

BACKGROUND OF THE INVENTION

1. Field of the Invention

This invention relates to a method and an apparatus for producing semiconductor devices and, more particularly, to a method and an apparatus for resin-molding semiconductor devices.

2. Description of the Related Art

FIG. 1 illustrates a known resin molding apparatus for resin-molding semiconductor devices. This apparatus has a resin molding section 10 in the center thereof, a loading section 7 and an unloading section 11 which are respectively disposed on the opposite sides of the resin molding section 10. The resin molding section 10, the loading section 7 and the unloading section 11 are covered by dust covers 2, 4 and 6, respectively.

The loading section 7 is provided with a loader 8 for supplying a lead frame and a resin tablet 22 to the resin molding section 10. The loader 8 has a tablet guide portion 24 for receiving the tablet 22 and a slidable stopper 26 for selectively opening and closing the bottom of the tablet guide portion 24.

The resin molding section 10 has a mold 31 and a press 32 for resin-molding semiconductor chips die-bonded to a lead frame which is supplied by the loader 8 of the loading section 7. The mold 31 comprises an upper mold part 28 and a lower mold part 30, and the press 32 acts to press the upper mold part 28 against the lower mold part 30. The lower mold part 30 is provided with a plurality of cavities for receiving semiconductor chips bonded to a lead frame and a pot 34 for receiving the tablet 22. These cavities are connected to the pot 34 through runners.

The unloading section 11 is provided with an unloader 12 for taking out resin-molded semiconductor devices from the resin molding section 10.

The dust cover 4 covering the resin molding section 10 has a first opening 16 on one side wall thereof facing the loading section 7 for allowing the passage of the loader 8, and a second opening 20 on another side wall thereof facing the unloading section 11 for allowing the passage of the unloader 12. A first shutter 24 is provided at the first opening 16 for opening and closing thereof. On the other hand, a second shutter 18 is provided at the second opening 20 for opening and closing thereof.

The operation of the above-described semiconductor resin-molding apparatus is as follows. A lead frame (not shown) to which semiconductor chips are die-bonded is set on the loader 8 of the loading section 7, and a resin tablet 22 is supplied to the tablet guide portion 24 of the loader 8. Then, the first shutter 14 is opened and the loader 8 is introduced into the resin molding section 10 through the opening 16 to set the load frame on the lower mold part 30. In this state, the semiconductor chips bonded to the lead frame are disposed in the cavities. At the same time, the stopper 26 of the tablet guide portion 24 is opened so that the tablet 22 received in the tablet guide portion 24 is dropped into the pot 34 formed in the lower mold part 30. When the loading of the lead frame and the tablet 22 as described above is completed, the loader 8 is returned back to the loading section 7 and the first shutter 14 is closed.

Next, the press 32 is operated to press the upper mold part 28 against the lower mold part 30 so that the mold 31 is closed. Then, the tablet 22 received in the pot 34 is melted by a suitable heating means such as a heater, and is forced out by a plunger or like means and injected through the runners into the cavities, whereby the semiconductor chips are resin-molded.

The resin with which the semiconductor chips and the lead frame are molded is cooled and solidified. Subsequently, the upper mold part 28 is raised by the press 32 and the second shutter 18 is opened. The unloader 12 of the unloading section 11 is then introduced into the resin molding section 10 through the second opening 20 so as to take out the molded semiconductor devices from the lower mold part 30. Each molded semiconductor device, as a product, is thereafter separated from runner portions in the unloading section 11 and placed in a magazine (not shown). Subsequently, the resin burrs adhering to the upper and lower mold parts 28 and 30 are removed by a cleaner (not shown).

During the operation, the dust cover 2 covering the loading section 7 prevents resin powder produced from the tablet 22 for scattering to the outside thereof; the dust cover 4 covering the resin molding section 10 prevents resin burrs produced by resin molding for scattering to the outside thereof; and the dust cover 6 covering the unloading section 11 prevents resin burrs and fine pieces of resin produced by separation of the product and runner portions from scattering to the outside thereof.

It is thus necessary to cover the loading section 7, the resin molding section 10 and the unloading section 11 with the dust covers 2, 4 and 6, respectively, in the known apparatus for producing semiconductor devices. In the loading section 7, semiconductor chips are, however, not yet molded and are exposed to air. Therefore, the resin powder produced from the tablet 22 becomes attached to the semiconductor chips, although the loading section 7 is covered with the dust cover 2. As a result, the properties of the semiconductor chips may be adversely affected.

SUMMARY OF THE INVENTION

In view of the above-described problem of the known art, an object of the present invention is to provide a production method and a production apparatus for producing resin-molded semiconductor devices which does not adversely affect the properties of the semiconductor chips.

To this end, according to one aspect of the present invention, there is provided a method for producing semiconductor devices comprising the steps of: supplying semiconductor chips bonded to a lead frame to a mold through a first supply route; supplying a resin tablet to the mold through a second supply route which differs from the first supply route; and closing the mold to resin-mold the semiconductor chips.

According to another aspect of the present invention, there is provided an apparatus for producing semiconductor devices comprising: resin-molding means for resin-molding semiconductor chips; loading means for supplying a lead frame, to which the semiconductor chips are bonded, to said resin-molding means; tablet supplying means for supplying a resin tablet to the resin-molding means; unloading means for taking the resin-molded semiconductor chips with the lead frame out from the resin-molding means; and dust cover means for shielding the space around the resin-molding means, the tablet supplying means and the unloading means.

DESCRIPTION OF THE PREFERRED EMBODIMENTS

Figure 1:
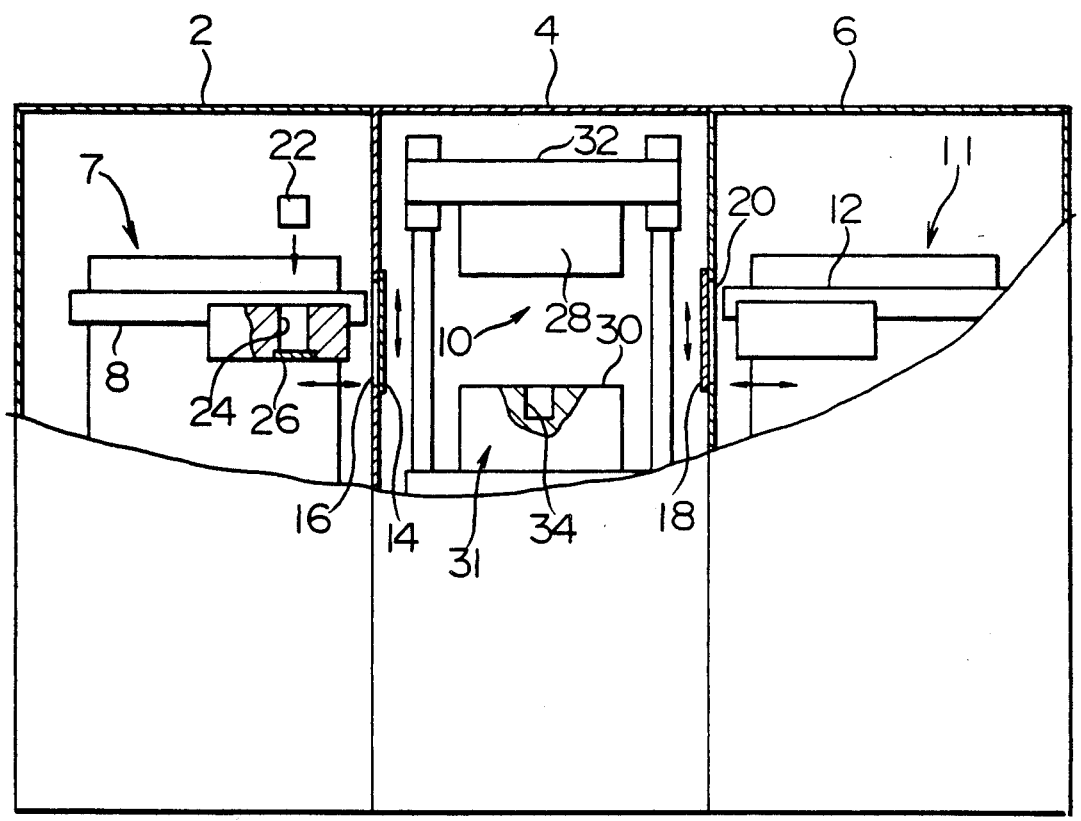
FIG. 1 is a front elevation, partly in section, of a known resin-molding apparatus for semiconductor devices.
Figure 2:
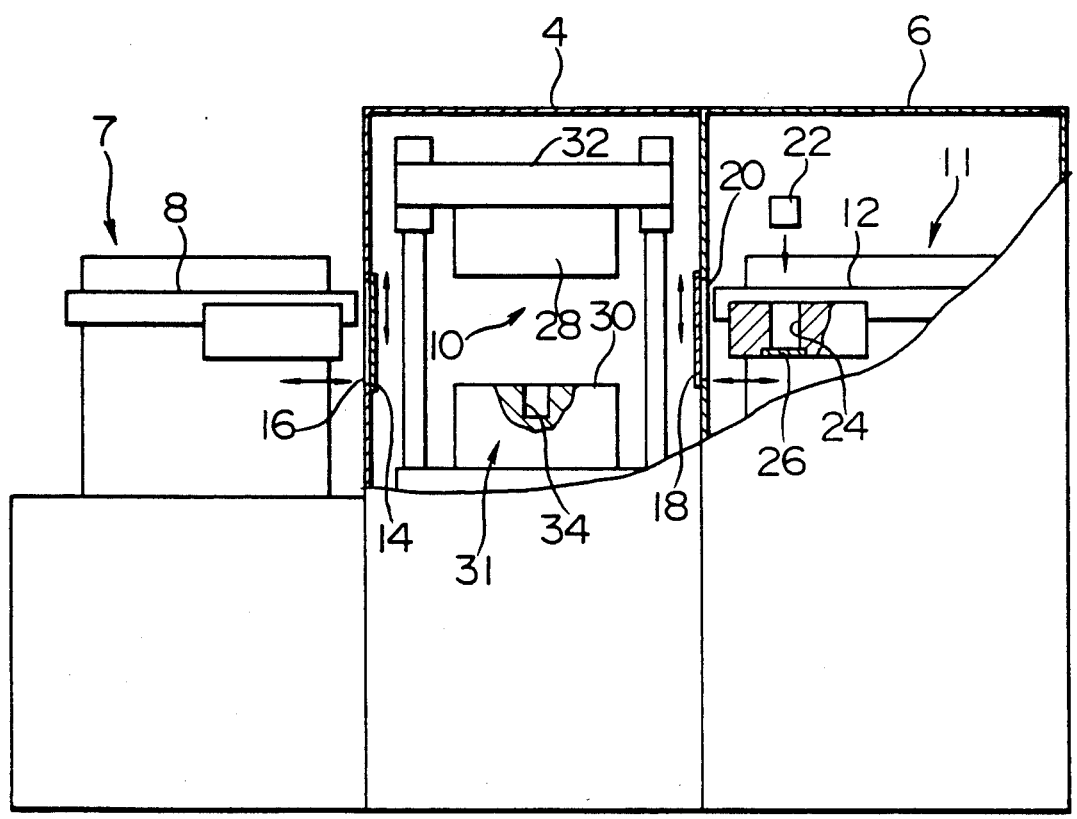
FIG. 2 is a front elevation, partly in section, of a resin-molding apparatus in accordance with an embodiment of the present invention.

Embodiments of the present invention will be described with reference to FIG. 2. In FIG. 2, a resin-molding apparatus of the invention illustrated has a resin molding section 10 in the center thereof, a loading section 7 and an unloading section 11 the latter two of which are respectively disposed on opposite sides of the resin molding section 10.

The loading section 7 is provided with a loader 8 for supplying a lead frame, to which semiconductor chips are die-bonded, to the resin molding section 10.

The resin molding section 10 has a mold 31 and a press 32 for closing the mold 31. The mold 31 comprises an upper mold part 28 and a lower mold part 30. The lower mold part 30 is provided with a plurality of cavities for receiving semiconductor chips bonded to a lead frame and a pot 34 for receiving the tablet 22. These cavities are connected to the pot 34 through runners. The upper mold part 28 also has a plurality of cavities corresponding to those in the lower mold part 30.

The unloading section 11 is provided with an unloader 12 for taking out resin molded semiconductor devices from the resin molding section 10. The unloader 12, also serving as tablet supplying means, has a tablet guide portion 24 for receiving the tablet 22 and a slidable stopper 26 provided at the bottom of the tablet guide portion 24. The bottom of the tablet guide portion 24 is selectively opened and closed by sliding the stopper 26.

The resin molding section 10 and the unloading section 11 are respectively covered with a first and a second dust cover 4 and 6. The first dust cover 4 covering the resin molding section 10 has a first opening 16 on one side wall thereof facing the loading section 7 for allowing the passage of the loader 8, and a second opening 20 on another side wall thereof facing the unloading section 11 for allowing the passage of the unloader 12. A first shutter 14 is disposed on the first opening 16 for opening and closing thereof. On the other hand, a second shutter 18 is disposed on the second opening 20 for opening and closing thereof. The loading section 7 is not covered with any dust cover.

The operation of this embodiment is as follows.

First, a lead frame (not shown), to which semiconductor chips are die-bonded is set on the loader 8 of the loading section 7 and at the same time a resin tablet 22 is supplied to the tablet guide portion 24 of the unloader 12 of the unloading section 11.

Then, the lead frame and the tablet 22 are supplied to the lower mold part 30 of the mold 31. That is, the first shutter 14 of the first dust cover 4 is opened and the loader 8 is introduced into the resin molding section 10 through the first opening 16 to set the lead frame on the lower mold part 30. In this state, the semiconductor chips bonded to the lead frame are disposed in the cavities of the lower mold part 30. On the other hand, the second shutter 18 of the first dust cover 4 is opened and the unloader 12 is introduced into the resin molding section 10 through the second opening 20. Then, the stopper 26 of the tablet guide portion 24 provided in the unloader 12 is opened so that the tablet 22 received in the tablet guide portion 24 is dropped into the pot 34 formed in the lower mold part 30.

When the lead frame and the tablet 22 are supplied to the lower mold part 30 through the respective routes as described above, the loader 8 and the unloader 12 are respectively returned back to the loading section 7 and the unloading section 11. Subsequently, the first and second shutters 14 and 18 are closed.

Next, the press 32 is operated to press the upper mold part 28 against the lower mold part 30 so that the mold 31 is closed. Then, the tablet 22 received in the pot 34 of the lower mold part 30 is melted by a suitable heating means such as a heater, and is forced out by, for example, a plunger and injected through the runners into the cavities. In this manner, the semiconductor chips are resin-molded.

After the resin with which the semiconductor chips and the lead frame are molded is cooled and solidified, the upper mold part 28 is raised by the press 32, and at the same time the second shutter 18 is opened so that the molded semiconductor devices are taken out from the lower mold part 30 by the unloader 12 which is introduced into the resin molding section 10 through the second opening 20. Thereafter, these molded semiconductor devices, being joined with runner portions, are separated as the products from the runner portions in the unloading section 11 and placed in a magazine (not shown).

After the products are taken out by the unloader 12, the second shutter 18 is closed and the resin burrs adhering to the upper and lower mold parts 28 and 30 are then removed by a cleaner (not shown).

In the embodiment as described, the first dust cover 4 covering the resin molding section 10 prevents resin burrs produced by resin molding from scattering to the outside thereof, and the second dust cover 6 covering the unloading section 11 prevents resin burrs and fine pieces of resin produced by separation of the runner portions and the cavity portions of the product from scattering to the outside thereof. Therefore, there is no need to cover the loading section 7 with any sort of dust cover, and the resin powder produced from the tablet 22 never becomes attached to the semiconductor chips in the loading section 7 because the tablet 22 is supplied to the resin molding section 10 not by the loading section 7 but by the unloading section 11. There is, therefore, little possibility that the properties of the semiconductor chips are adversely affected by the resin powder.

In the embodiment as described, the resin molding section 10 and the unloading section 11 are respectively covered by the dust covers 4 and 6. This, however, is not exclusive and the resin molding section 10 and the unloading section 11 may be covered together by a common dust cover. In this case, there is no need to provide the second shutter 18.

Although in the described embodiment the unloader 12 serves as a tablet supplying means, such a tablet supplying means may be provided separately from the unloader 12. The point is to supply the tablet 22 to the resin molding section 10 from outside of the load section 7. When the tablet supplying means is provided separately from the unloading section 11, it may be covered with a third dust cover or a common dust cover together with the resin molding section 10 and the unloading section 7.

What is claimed is:

1. An apparatus for producing semi-conductor devices comprising:
    resin-molding means for resin-molding semiconductor chips;
    loading means for supplying a lead frame, to which a semiconductor chip is bonded, to said resin-molding means;
    tablet supplying means for supplying a resin tablet to said resin-molding means;
    unloading means for unloading a resin-molded semiconductor chip and lead frame from said resin-molding means; and
    dust cover means for shielding a space around said resin-molding means, said tablet supplying means, and said loading means, wherein said loading means and the space around said tablet supplying means are shielded from each other by said dust cover means to prevent dust from a resin tablet for reaching a lead frame prior to resin molding of the lead frame.

2. An apparatus according to claim 1, wherein said dust cover means comprises a common dust cover covering said resin-molding means, said tablet supplying means and said unloading means.

3. An apparatus according to claim 2, wherein said common dust cover has a first opening formed on one side wall thereof facing said loading means for passing said lead frame supplied from said loading means to said resin-molding means.

4. An apparatus according to claim 3, further comprising a first shutter which selectively opens and closes said first opening.

5. An apparatus according to claim 1, wherein said tablet supplying means and said unloading means comprise a unitary tablet-supplying and unloading means.

6. An apparatus according to claim 5, wherein said dust cover means comprises a first dust cover covering said resin-molding means and a second dust cover covering said unitary tablet-supplying and unloading means.

7. An apparatus according to claim 6, wherein said first dust cover has a first opening formed on one side wall thereof facing said loading means for passing said lead frame supplied from said loading means to said resin-molding means.

8. An apparatus according to claim 7, further comprising a first shutter which selectively opens and closes said first opening.

9. An apparatus according to claim 6, wherein said first dust cover has a second opening formed on another side wall thereof facing said single tablet-supplying and unloading means for passing said resin tablet supplied from said single tablet-supplying and unloading means to said resin-molding means and for passing said resin-molded lead frame taken out from said resin-molding means to said unitary tablet-supplying and unloading means.

10. An apparatus according to claim 9, further comprising a second shutter which selectively opens and closes said second opening.

* * * * *